United States Patent [19]

Field

[11] 4,253,375
[45] Mar. 3, 1981

[54] LOADING HEAD

[75] Inventor: Werner Field, Rockaway, N.J.

[73] Assignee: The United States of America as represented by the Secretary of the Army, Washington, D.C.

[21] Appl. No.: 66,600

[22] Filed: Aug. 14, 1979

[51] Int. Cl.$^3$ .................. C06B 21/00; F42B 13/48
[52] U.S. Cl. ................................ 86/1 R; 102/67
[58] Field of Search .................. 86/1 R; 102/67

[56] References Cited

U.S. PATENT DOCUMENTS

| | | | |
|---|---|---|---|
| 3,411,399 | 11/1968 | Griffith | 86/1 R |
| 3,952,628 | 4/1976 | Boswell | 86/1 R |

Primary Examiner—Leland A. Sebastian
Attorney, Agent, or Firm—Nathan Edelberg; Robert P. Gibson; Max Yarmovsky

[57] ABSTRACT

A loading head used for pressing grenades or other explosive containers into a projectile has an internal safety switch. The grenades have a transverse safety slider which normally remains in a retracted position but which can fail and extend into an armed position during loading. The loading head has a placing member containing at least one cavity. This cavity is sized to engage the grenade and encircle its slider. Mounted within the cavity is an annular switching device. When the placing member is engaging a grenade, the annular switch encircles the safety slider. In the event the safety slider should improperly release while within the cavity, the switching device is actuated. In a disclosed embodiment, actuation of the switching device is utilized to disable a ram which is driving the placing member so that it remains in position over the grenade or other explosive container. Being retained in this fashion, an operator can safely retract the slider while the grenade is still within the press.

12 Claims, 5 Drawing Figures

LOADING HEAD

GOVERNMENT INTEREST

The invention described herein may be manufactured, used or licensed by or for the government for governmental purposes without the payment to me of any royalties thereon.

BACKGROUND OF THE INVENTION

The present invention relates to a loading head for pressing explosive containers and in particular to heads having an annular switching device mounted within a cavity.

In the past a group of explosive grenades have been fitted into a projectile by means of a press. Typically, the grenades are positioned at grenade receptacles in the projectile and are forced thereinto by a placing member having a pattern of cavities matching that of the grenade receptacles. The placing member is driven by a conventional hydraulic ram or other pressing machine. During this operation the safety pin in the grenade is automatically removed. Normally such removal does not arm the grenade and complete the path of the explosive train. The path is completed when a safety slider in the grenade springs to its fully extended position, thereby inserting a detonator into the explosive train. The slider is normally retained in its retracted position by the fuze mechanism until the projectile and its grenades are launched.

However, the fuze mechanism may be defective so that when a safety pin is removed the slide travels until it is stopped by contacting a restraining surface or, if there is no such restraint, until it reaches the fully armed position. The placing member has a cavity shaped and sized to restrict the movement of the slider; so configured, the safety slider is restrained from reaching the armed position while the placing member engages it even though the other safeties fail to function.

When the placing head has seated the grenades and withdrawn the safety pins as described, the hydraulic or other pressing machine automatically withdraws, leaving the grenades partially captive in the projectile. When the bottom of the placing head clears the level of the slide during this withdrawal action, a fuze whose slider has been released by a defective safety and retained by the cavity wall up to this point will extend to the fully armed position. With the slider thus extended, the grenade is likely to explode. In the past a press operator was required to observe whether the safety slider extended into its armed position after the safety pin was removed and the placing member was removed. This approach, relying on the diligence and care of the press operator, is necessarily subject to the disastrous consequences of human errors and ommissions. In the event that a single grenade explodes, all of the others are likely to explode simultaneously.

The present invention reduces such problems and dangers by adding to each cavity an annular switching device which encircles the slider when the grenade is engaged. The annular switch can be actuated in the event that the slider improperly extends while the grenade is being engaged by the placing member. Actuation of the annular switch can be used to stop the movement of the ram that is pressing the placing member.

If the placing member is thus retained in engagement with the grenade, the danger of inadvertent explosion is substantially reduced. In the preferred embodiment, the cavity of the placing member surrounding the slider is sufficiently small that the slider cannot fully extend. Accordingly, the grenade is maintained in a disarmed position so that the operator can take steps to safely disarm the defective grenade. Therefore, apparatus according to the present invention significantly improves safety and efficiency in the manufacture of weapons.

SUMMARY OF THE INVENTION

In accordance with illustrative embodiments demonstrating features and advantages of the present invention there is provided a loading head for pressing an explosive container. This container has a transverse safety slider. This slider is moveable from a retracted position to an armed position. The loading head includes a placing member and an annular switching device. The placing member has at least one cavity sized to engage the explosive container and to encircle its slider. The annular switching device is mounted in the cavity in a position to encircle an engaged explosive container and its slider. The switching device is actuated in response to the slider moving from its retracted position into mechanical contact with the switching device. The loading head also includes utilization means which is responsive to actuation of the switching device.

Also in accordance with the present invention there is provided a method for pressing an explosive container into a receptacle with a placing member. The placing member has a cavity lined with an annular switching device. The container has a transverse safety slider. The method includes the step of placing the container between the receptacle and cavity, positioning the slider within the annular switching device. Another step is pressing the placing member into the container with a force sufficient to seat it in the receptacle. The method also includes the step of retaining the placing member in engagement with the container in response to the safety slider projecting itself into and actuating the switching device.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
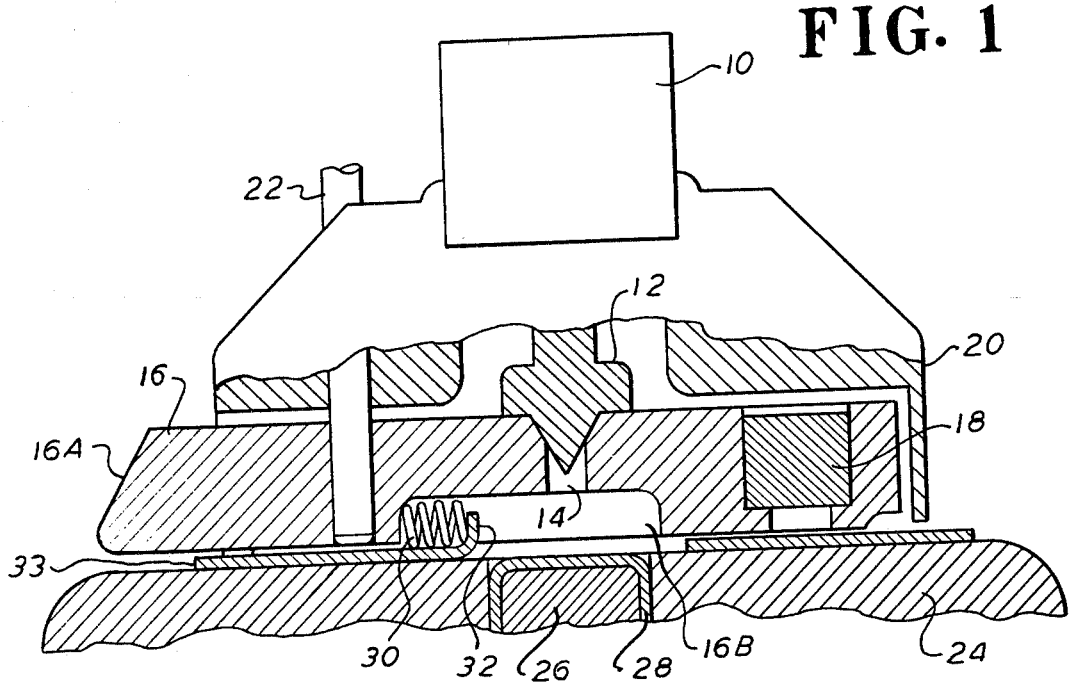
FIG. 1 is an elevational view, partly in section, of the upper portion of an explosive container.

Referring to FIG. 1, there is shown the upper portion of a known grenade, comprising fuze section 10 and its associated arming stem 12. Arming stem 12 engages an aperture 14 in safety slider 16. Stem 12 is retained in this position by fuze assembly 10 until the entire assembly is fired into free flight. A known cloth tape mechanism in fuze 10 is employed to rotate and withdraw stem 12 from aperture 14. Slider 16 is essentially a rectangular bar having a beveled end 16a, a rectangular spring chamber 16b and a cylindrical detonator chamber containing detonator 18. Slider 16 is slidably mounted within housing 20. Fitted through alignable apertures in both housing 20 and slider 16 is safety pin 22. In the illustrative position, safety pin 22 prevents slider 16 from moving out of the location illustrated herein. Housing 20 is suitably mounted on plate 33 which is secured to canister 24. Canister 24 contains the main explosive charge (not shown). Above the main explosive charge is a lead charge 26 of RDX which is contained in cup 28 mounted in canister 24.

As will be apparent to persons skilled in this art, removal of safety pin 22 and retraction of stem 12 will allow slider 16 to move out of housing 20. This motion is caused by spring 30 which is trapped between one face of spring chamber 16b and tab 32, which is an upwardly bent portion of the support plate 33. When slider 16 is freed, spring 30 expands and drives slider 16 outward, thereby aligning detonator 18 with lead charge 26. So aligned, the explosive train between fuze 10 and the main charge of canister 24 is complete. Accordingly, fuze 10 is able to detonate the main charge.

Figure 2:
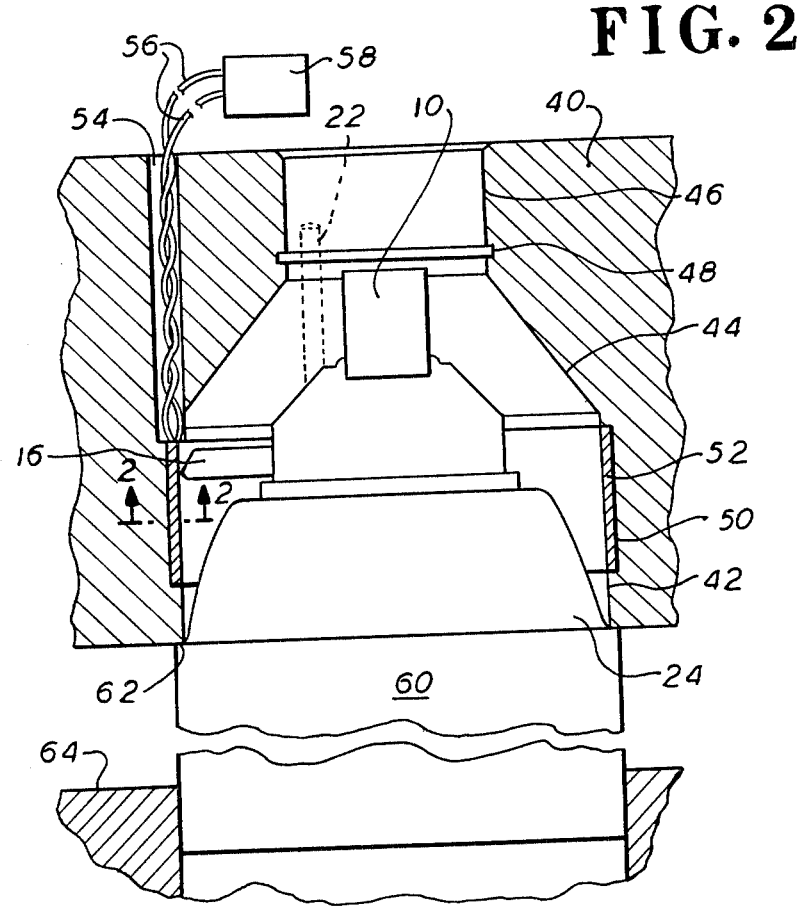
FIG. 2 is an elevational view, partly in section, of a loading head engaging the explosive container of FIG. 1, in accordance with the present invention.

Referring to FIG. 2, a loading head is shown herein as a placing member 40 formed from a plate. Placing member 40 has a cavity comprising cylindrical wall 42, frustro-conical wall 44 and cylindrical wall 46. Walls 44 and 46 together form a funnel-shaped surface. Walls 46 and 42 have rectangular grooves, 48 and 50 cut into them, respectively.

Adhesively mounted within groove 50 is an annular switching device shown herein as a pressure-sensitive strip switch 52 which is bowed into a hollow cylindrical shape. As explained in further detail hereinafter, switching device 52 is an insulated package containing a pair of metallic strips separated by a lattice so that upon application of a radial (transverse) pressure these strips touch to complete an electrical circuit. This circuit is connected to switch device 52 by means of lead wires 56 which connect to different ones of the pair of metallic strips. Switches similar to switch 52 are commercially available from manufacturers such as Tape Switch Corporation of America and W. H. Brady Company. Lead wires 56 are routed through cylindrical bore 54 which extends through the upper face of placing member 40 to annular switching device 52. Lead wires 56 connect between device 52 and a utilization means shown herein as block 58.

Utilization means 58 may take many forms. Preferably, utilization means 58 includes appropriate actuators and/or brakes to stop and disable a hydraulic ram that drives placing member 40. Alternatively, utilization means 58 may be a simple light, buzzer or other warning device to alert an operator of a potential problem.

Grenade 60, which was partially illustrated in FIG. 1, is shown to a further extent herein. Grenade 60 is shown engaged in the cavity of placing member 40. As illustrated, the lower edge of wall 42 engages grenade 60 at its shoulder 62. In this manner placing member 40 and its associated ram can drive grenade 60 downwardly into a receptacle of projectile casing 64, partially illustrated herein. Previously illustrated elements of grenade 60 bear identical reference numerals herein and in the other figures.

Safety pin 22 is illustrated in phantom since it is assumed for purposes of this figure that the pin has been withdrawn. Also, safety slider 16 is shown extending outwardly and in mechanical contact with annular switching device 52. As is apparent from the foregoing description, extension of slider 16 in this fashion, indicates a malfunction of fuze assembly 10. It is to be noted that slider 16 has not moved to its fully armed position since it is restrained by switching device 52 and associated cylindrical wall 42. Thus restrained, slider 16 cannot align its detonator 18 (FIG. 1) into the explosive train of grenade 60. Accordingly, grenade 60, while retained in placing member 40 as shown, is unlikely to explode any may be disarmed manually in this condition through the opening defined by the cylindrical wall 46 in the top of the plate.

Figure 3:
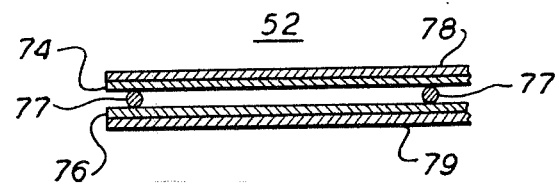
FIG. 3 is a transverse sectional view of the switching device of FIG. 2 taken along line 2—2.

Referring to FIG. 3, the switching device 52 of FIG. 2 is shown as a partial, transverse and diametric section. Device 52 is formed from a metallic layer 74 and a metallic strip 76. Layer 74 and strip 76 are metallic bands which are separated by an insulating lattice 77. Lattice 77 is in the form of a ladder having curved "steps," although other lattice structures are possible. For example, a sinusoidal filament or other structure may be employed instead. Layer 74 faces inward into the cavity of member 40 (FIG. 2) and is covered by flexible insulating coating 78. A similar flexible insulating coating 79 covers strip 76.

Figure 4:
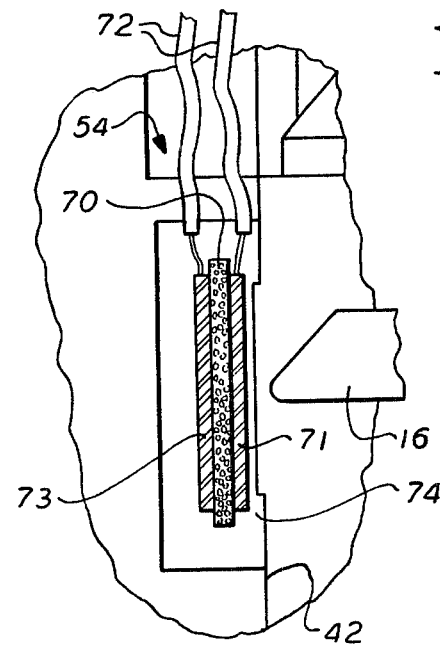
FIG. 4 is a detail drawing showing a modification to a portion of FIG. 2.

Referring to FIG. 4, an annular switching device that is an alternative to that of FIG. 2 is shown. This switching device comprises strip switch 70 which is sandwiched between metallic strips 71 and 73. Switch 70 is a normally non-conductive plastic material impregnated with conductive granules. Upon being compressed, the conductive granules of switch 70 come into sufficient contact that the resistance of switch 70 drops significantly. Such material is commercially available from manufacturers such as Dynacon, West Milford, N.J. Switch 70 and strips 71 and 73 are encapsulated in a flexible insulating sheath 74 whose inner wall is thinned to allow slider 16 to flex it. Accordingly, a slider bearing upon sheath 74 causes electrical continuity between strip 71 and strip 73. Connection across switch 70 is made by lead wires 72.

Figure 5:
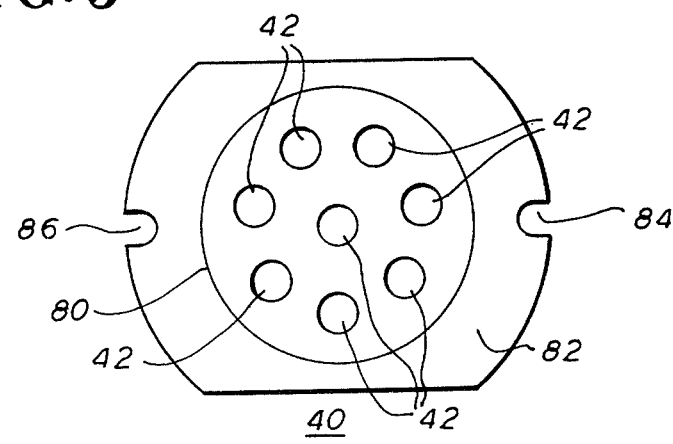
FIG. 5 is a bottom view of the placing member of FIG. 2.

Referring to FIG. 5, a bottom view of placing member 40 is illustrated on a reduced scale. Cavities 42, one of which was previously illustrated in FIG. 2 are shown herein in simplified form as cylindrical walls. Seven of these eight cavities 42, are symetrically disposed around a remaining central cavity. Cavities 42 are formed in a cylindrical pedestal 80 which is affixed to a retaining plate 82 that has retaining slots 84 and 86. Slots 84 and 86 are used to bolt placing member 40 to the driving ram of a conventional hydraulic press. It is to be appreciated that the principles of the present invention can be practiced with loading heads having different patterns of cavities and that the invention can be practiced with a single cavity or more than one cavity.

To facilitate an understanding of the principles associated with the foregoing apparatus, its operation will be briefly described. Placing member 40 (FIG. 2) is operated by a well-known hydraulic press and can reciprocate vertically with respect to projectile 64. Initially the ram associated with placing member 40 is retracted from projectile 64. An operator positions the receptacles of projectile 64 in alignment with the cavities of placing member 40. The operator then inserts grenades such as grenade 60, between the receptacle of projectile 64 and the cavities associated with placing member 40 so that each grenade is axially aligned with the cavities in placing member 40 and the receptacles of projectile 64. Placing member 40 is moved toward projectile 64 and presses grenades such as grenade 60 on its shoulder 62 to force the grenades into the receptacles of projectile 64. Prior to placing member 40 moving away from projectile 64, safety pin 22 is removed. Removal of safety pin 22 is done automatically by mechanical fingers. As shown in FIG. 2, such removal has resulted in safety slider 16 improperly projecting into mechanical contact with annular switching device 52.

The mechanical contact between switching device 52 and slider 16 closes a circuit through lead wires 56. In this embodiment, closing of the circuit causes a contactor within block 58 simultaneously to open and disable the hydraulic pump motor of the hydraulic ram which is driving placing member 40. Accordingly, further motion ceases and placing member 40 remains in engagement with grenade 60 as illustrated in FIG. 2.

At this time the operator takes steps to correct the fault. For example, by inserting an implement in the interspace between grenade 60 and placing member 40, slider 16 can be forced back into the grenade. Thereafter, safety pin 22 can then be replaced in grenade 60 to entrap slider 16 in its retracted or unarmed position. If no other danger appears at that time, the operator can then intervene to restore power to the hydraulic ram so that placing member 40 is retracted from grenade 60. Accordingly, grenade 60 can be removed and its defective fuze assembly 10 replaced or repaired.

It is appreciated that modifications and alterations can be implemented with respect to the apparatus just described. For example, the shape of the cavities within the placing member can be altered to suit the particular grenade or other explosive container which is being serviced. In addition, the placing member can be composed as a single or multi-cavity device. In addition various materials can be employed to achieve the desired strength, wear etc. Moreover, the annular switching device can be composed of various materials to provide a switch that is mechanically sensitive to forces applied by a safety slider. Obviously many other modifications and variations of the present invention are possible in light of the above teachings. It is therefore to be understood that within the scope of the appended claims the invention may be practiced otherwise then as specifically described.

I claim:

1. A loading head for pressing an explosive container, said container having a transverse safety slider, said slider being movable from a retracted position to an armed position, said loading head comprising:
   a placing member having at least one cavity sized to engage said explosive container and to encircle said slider;
   an annular switching device mounted in said cavity in a position to encircle said engaged explosive container and its slider, said switching device being actuated in response to said slider moving from said retracted position into mechanical contact with said switching device; and
   utilization means responsive to actuation of said switching device.

2. A loading head according to claim 1, wherein said cavity is sized to prevent said slider from moving into its armed position while said placing member is engaging said explosive container.

3. A loading head according to claim 2, wherein said annular switching device comprises:
   a metallic layer; and
   a non-conductive lattice contiguous to said metallic layer, said lattice having elements spaced to allow said layer to bow through said lattice.

4. A loading head according to claim 3, wherein said switching device further includes:
   a metallic strip, said lattice being mounted contiguously between said strip and said layer, said utilization means being connected across said metallic strip and layer.

5. A loading head according to claims 1, 2, 3 or 4, wherein said placing member includes:
   ram apparatus operable to reciprocate between a back and a ramming position, said placing member being attached to and reciprocating with said ram apparatus, said ram apparatus being retained in said ramming position in response to actuation of said switching device.

6. A loading head according to claim 5, wherein said explosive container has a removable safety pin extending longitudinally from the forward end of said explosive container, and wherein said placing member comprises:
   a plate having an aperture sized to simultaneously engage said explosive container and allow removal of said safety pin through said plate.

7. A loading head according to claim 6, arranged to press a plurality of containers similar to said explosive container, wherein said plate includes a plurality of spaced apertures each sized to simultaneously engage a corresponding one of said plurality of containers and allow removal of its safety pin through said plate.

8. A loading head according to claim 7, wherein each of said plurality of spaced apertures is shaped as a funneled bore contiguous with a coaxial cylindrical bore, corresponding ones of said plurality of containers being partially insertable in through said cylindrical bore.

9. A loading head according to claim 6, wherein said cavity is shaped to include a cylindrical wall having an annular groove, said annular switching device being mounted in said annular groove.

10. A loading head according to claim 9, wherein said switching device has a hollow cylindrical shape and is sized to be flushly mounted in said groove.

11. A method for pressing an explosive container into a receptacle with a placing member having a cavity lined with an annular switching device, said container having a transverse safety slider, comprising the steps of:
   placing said container between said receptacle and cavity, positioning said slider within said annular switching device;
   pressing said placing member into said container with a force sufficient to seat it in said receptacle; and
   retaining said placing member in engagement with said container in response to said safety slider projecting itself into and actuating said switching device.

12. A method according to claim 11, wherein said container has a longitudinal, removable safety pin, further comprising the steps of:
   removing said safety pin before said placing member is released from its engagement with said container;
   retracting said slider and reinserting said safety pin in response to said switching device being actuated; and retracting said placing member from said container.

* * * * *